H. EDDY.
Crib for Horses.
No. 1,300. Reissued April 8, 1862.
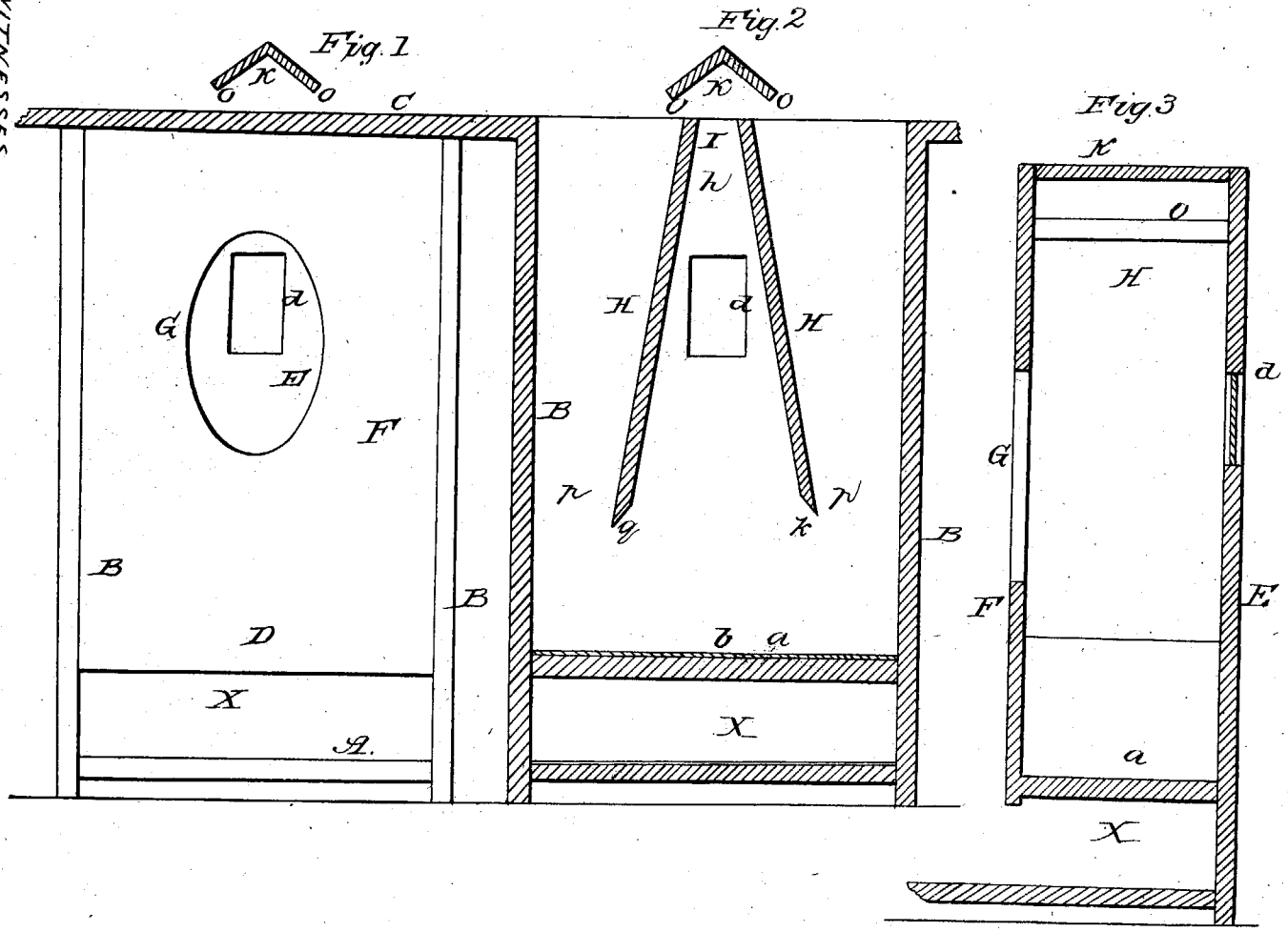
WITNESSES
Henry T. Eddy
Willard Eddy
INVENTOR
Henry Eddy
N. PETERS, Photo-Lithographer, Washington, D. C.

UNITED STATES PATENT OFFICE.

HENRY EDDY, OF NORTH BRIDGEWATER, MASSACHUSETTS.

IMPROVEMENT IN CRIBS FOR HORSES.

Specification forming part of Letters Patent No. 16,357, dated January 6, 1857; Reissue No. 1,300, dated April 8, 1862.

*To all whom it may concern:*

Be it known that I, HENRY EDDY, M. D., of North Bridgewater, in the county of Plymouth and State of Massachusetts, have invented a new and useful Mode of Constructing Stalls or Cribs for Horses; and I do hereby declare that the same is fully described and represented in the following specification and the accompanying drawings, letters, figures, and references thereof.

Of the said drawings, Figure 1 denotes a front view of the crib; Fig. 3, a vertical and transverse section of the crib, and Fig 2 a vertical and longitudinal section of the same.

My design in this invention is to construct a crib in such a manner that the horse may be fed without the possibility of depositing hay-seed or other matter upon the head or foretop of the horse, and in such a manner that the horse shall not breathe upon his hay nor waste a particle of his food.

The crib represented in the drawings has a certain connection with the stall which may be occupied by a horse. A indicates a floor of the stall, upon which the horse stands, and C indicates an upper floor parallel to the floor A, as seen in Fig. 1. The crib D stands upon the floor A, or is attached to it, as shown in Fig. 1. The crib D consists in part of a deep box as its external case, which has four sides or walls, E F B B, united together as shown in Fig. 1, and is provided with a bottom, *a*, as shown in Fig. 2. The partition or boarding E forms the front side of the crib, as shown in Fig. 1. Said partition is provided with the window *d*, for the more perfect ventilation of the stall. I usually construct the crib in such a manner that the side E is formed by a part of the wall or covering to the stable. The partitions or walls B B, which extend from the floor A to the upper floor, C, as shown in Fig. 1, constitute the ends of the crib. In constructing the crib for use the walls or ends B B may be formed by the partitions which are constructed for the purpose of separating the stall from adjacent stalls. The back or rear part of the crib or manger is formed by the partition F, with an oblong hole, G, in it, as seen in Fig. 1, for the insertion of the head and neck of the horse, which partition separates the crib from the main body of the stall. The bottom or floor of the crib *a*, is covered with a metallic plate, *b*, as seen in Fig. 2, to protect the same from the teeth of the horse. The ends of the crib B B, as seen in Figs. 1 and 2, extend from the floor A to the upper floor, C. The inclined planes H H are inserted between the sides of the crib E F, as seen at H in Fig. 3, and are so placed as to leave the opening I between them, as seen in Fig. 2. These inclined planes are employed to allow the food of the horse to descend without coming in contact with his head. The triangular cap K, as seen in Fig. 2, which entirely spans the opening I, is so placed as to leave the openings *o o* on either side beneath it. Said openings constitute a ventilator, through which the breath of the horse readily escapes. The space *g h k*, as seen in Fig. 2, partially inclosed by the inclined planes H H, constitute a space which may be occupied by the head of the horse, and his breath does not penetrate his hay. The cap K is employed to protect the head of the horse from falling hay-seed and other matter. The openings *p p*, as seen in Fig. 2, which are formed between the lower extremity of the inclined planes H H and the ends of the crib B B are for the delivery of hay and grain to the horse. The grain descends readily, and the hay is pulled through as the horse needs it and no faster.

X is a space beneath the floor of the crib, as seen in Fig. 1, for storing the bedding of the horse.

The same general results which have been described may be secured by other modes of construction which are analogous—viz., the particular form of the cap is not material. It may be placed horizontally or in any other convenient position. Dispensing with the cap K and one of the inclined planes H in Fig. 2, the other inclined plane H may be extended upward in the same direction until it reaches a point over the end B, and the end B may be extended upward until it approaches very near to the inclined plane H, with an opening between them similar to the opening I, which is seen in Fig. 2, which shall answer a similar purpose, in which case all the feed will descend through one opening, *p*. The precise point at which the breath of the horse shall escape is not material. Dispensing with the cap, the inclined planes may be extended upward until they shall meet at a point above the upper floor, and an opening made for the escape of the breath of the horse laterally or at any other convenient point, or the inclined planes may be placed in the position just named, with no ventilators or opening between them, or one inclined plane may meet the upper floor and no ventilator be formed. The inclined planes may be varied in position until they become perpendicular without materially counteracting the purpose subserved by them, so long as they are combined with the opposite sides of the crib.

Substantially the same mode of construction herein described may be adopted for other animals than horses, especially neat cattle. In which latter case one inclined plane should be dispensed with and the metallic collar inverted to give room for the horns of the animal.

Some of the advantages to be derived from the crib herein described, are as follows: first, the crib is abundantly ventilated; second, by its use the head of the horse cannot be soiled with hay-seed or other matter; third, the horse cannot soil his hay by breathing upon it and thus render it unfit for use; fourth, he cannot waste a particle of his food.

I claim nothing original in the construction of a deep crib or manger, with an oblong hole in it for the insertion of the head and neck of the horse, and nothing original in the construction of a spout or conductor for the delivery of food to the horse, the sides of which are formed independently of the sides of the crib.

What I claim, and desire to secure by Letters Patent, is—

1. The application and use of the inclined planes H H, with the vertical opening I between them, in combination with the sides of the crib E F, substantially as specified, and for the purposes herein set forth.

2. The space *g h k*, partially inclosed by the inclined planes H H, with the opening I, substantially as specified.

3. The ventilator *o*, in combination with the planes H H, substantially as described.

4. The cap K, when applied to the crib D, substantially as described, and for the purpose herein set forth.

In testimony whereof I have set my hand this 27th day of December, A. D. 1861.

HENRY EDDY.

Witnesses:
HENRY T. EDDY,
WILLARD EDDY.